(12) United States Patent
Duttweiler et al.

(10) Patent No.: US 6,628,780 B2
(45) Date of Patent: *Sep. 30, 2003

(54) ECHO CANCELLATION IN THE NETWORK FOR DATA APPLICATIONS

(75) Inventors: Donald Lars Duttweiler, Rumson, NJ (US); David Goodwin Shaw, Middletown, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,901

(22) Filed: Oct. 31, 1997

(65) Prior Publication Data

US 2002/0057790 A1 May 16, 2002

(51) Int. Cl.[7] .................................................. H04M 1/00
(52) U.S. Cl. ........................................ 379/406; 379/410
(58) Field of Search ............................ 379/100.12, 406, 379/410, 406.8; 370/259; 375/222, 233; 708/322

(56) References Cited

U.S. PATENT DOCUMENTS

| | | | | |
|---|---|---|---|---|
| 4,782,459 A | * | 11/1988 | Johnston | 708/322 |
| 5,404,394 A | * | 4/1995 | Dimolitsas et al. | 379/100.12 |
| 5,453,986 A | * | 9/1995 | Davis et al. | 370/259 |
| 5,663,955 A | * | 9/1997 | Iyengar | 379/406.08 |
| 5,757,849 A | * | 5/1998 | Gelblum et al. | 375/222 |
| 5,764,759 A | * | 6/1998 | Hamilton et al. | 379/406.08 |
| 5,841,809 A | * | 11/1998 | Koizumi et al. | 375/233 |
| 5,933,494 A | * | 8/1999 | Yang et al. | 379/410 |

* cited by examiner

*Primary Examiner*—Forester W. Isen
*Assistant Examiner*—Jefferey Harold

(57) ABSTRACT

A network-based CODEC (coder-decoder) includes an echo canceler. This CODEC recognizes the presence of a data call by detecting predefined signaling portions of a modem handshaking process. For each detected data call, the CODEC uses a stored channel model for performing echo cancellation during the data call. The CODEC trains off-line during selected segments of the modem call and then stores the new channel model for use in a future data call.

24 Claims, 3 Drawing Sheets

ECHO CANCELLATION IN THE NETWORK FOR DATA APPLICATIONS

FIELD OF THE INVENTION

This invention relates generally to communications and, more particularly, to echo cancellation in a communications system.

BACKGROUND OF THE INVENTION

Today, modems, or data communications equipment (DCEs), are available that provide the capability to communicate at data rates as high as 56 kbps (thousands of bits per second) over a plain-old-telephone system (POTS) local loop using full-duplex communications. This enables high-speed switched data connections through the public switched telephone network (PSTN) for accessing, e.g., the Internet.

Unfortunately, although the capability is there, a user of a high-speed modem cannot realistically expect to consistently establish data connections at, e.g., 56 kbps. For example, during establishment of a switched data connection, the 56 kbps modem evaluates the response of the communications channel for negotiating the data rate with the opposite endpoint. As such, limiting factors like line conditions over the local loop, may result in negotiated data rates that are less than the 56 kbps.

We have realized that one limiting factor in achieving a high-speed data connection is the amount of echo that a full-duplex modem can remove from a received signal. Currently, a full-duplex modem startup, or handshaking, sequence includes a tone with phase reversals that is recognized by echo cancellation equipment in the PSTN as a signal to disable the network echo cancelers. In other words, the network equipment of the PSTN does not perform echo cancellation during a data call. As such, the modem at each end of the data connection includes a far-echo canceler to compensate for far echoes. However, the network equipment also converts the analog local loop signal into a digital signal and then compands the digital signal using either A-law or $\mu$-law companding rules. The network device that performs this function is known as a CODEC (coder-decoder). Unfortunately, this companding by the network equipment introduces non-linearities into the signal. These non-linearities limit the amount of far-echo that can be removed by a modem under different line conditions and, therefore, may negatively affect the negotiated data rate.

SUMMARY OF THE INVENTION

In the above-mentioned network equipment, the precision and signal to quantization ratio of the above-mentioned digital signal can be significantly higher than the companded version of the digital signal. As such, we have realized that if echo cancellation is applied during a data call on the digital signal (before companding), more echo cancellation can be achieved than in a DCE or other network echo canceler equipment because of this higher precision. As a result, since more echo may be removed, the probability of connecting a data call at a higher data rate increases. However, training of such a network echo canceler during a data call presents a problem. In particular, such a network echo canceler would create an apparent time-varying channel from the perspective of the DCE, which would have difficulty training the far-echo canceler of the DCE correctly. Therefore, and in accordance with the principles of the invention, a network echo canceler performs echo cancellation on a digital signal during a data call, where the network echo canceler is trained off-line.

In an embodiment of the invention, a CODEC includes an echo canceler. This CODEC recognizes the presence of a data call by detecting predefined signaling portions of a modem handshaking process. The CODEC performs echo cancellation on the respective digital signal of the detected data call before performing a companding operation. For each such data call, the CODEC uses a stored channel model for performing the echo cancellation. At the start of each detected data call, the CODEC trains off-line during selected segments of the modem startup signaling and then stores the new channel model for use in a future data call. The modem training sequence includes signals that are almost optimal for high-speed good quality adaptations. Since each CODEC is generally allocated for the same subscriber loop from call to call, the characteristics of the impedance match with the local loop should be very similar from one data call to the next. This means that adaptation during prior data calls should provide a channel model that will work very well for canceling echo during subsequent calls.

DETAILED DESCRIPTION

Figure 1:
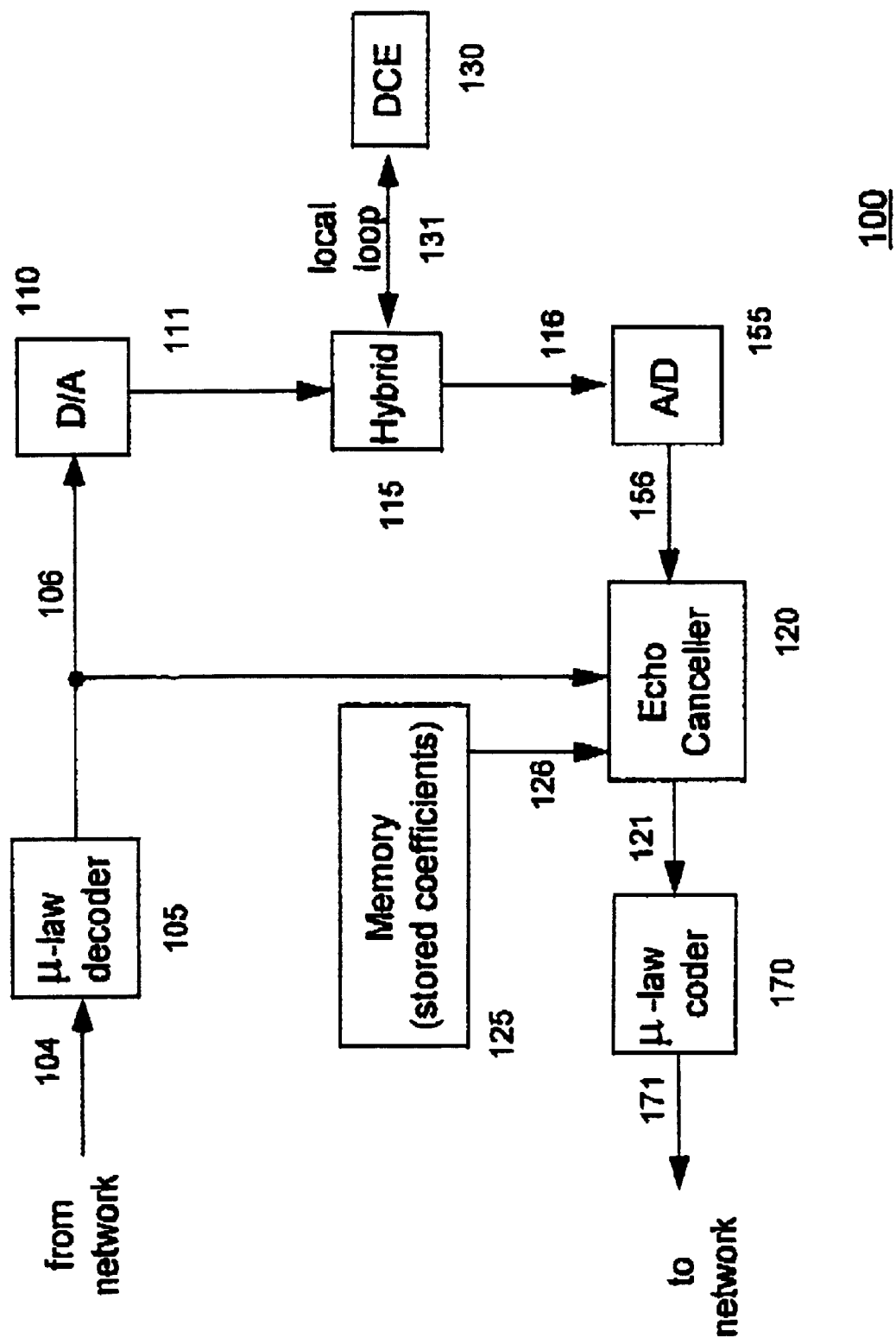
FIG. 1 shows a high-level block diagram embodying the principles of the invention.
Figure 2:
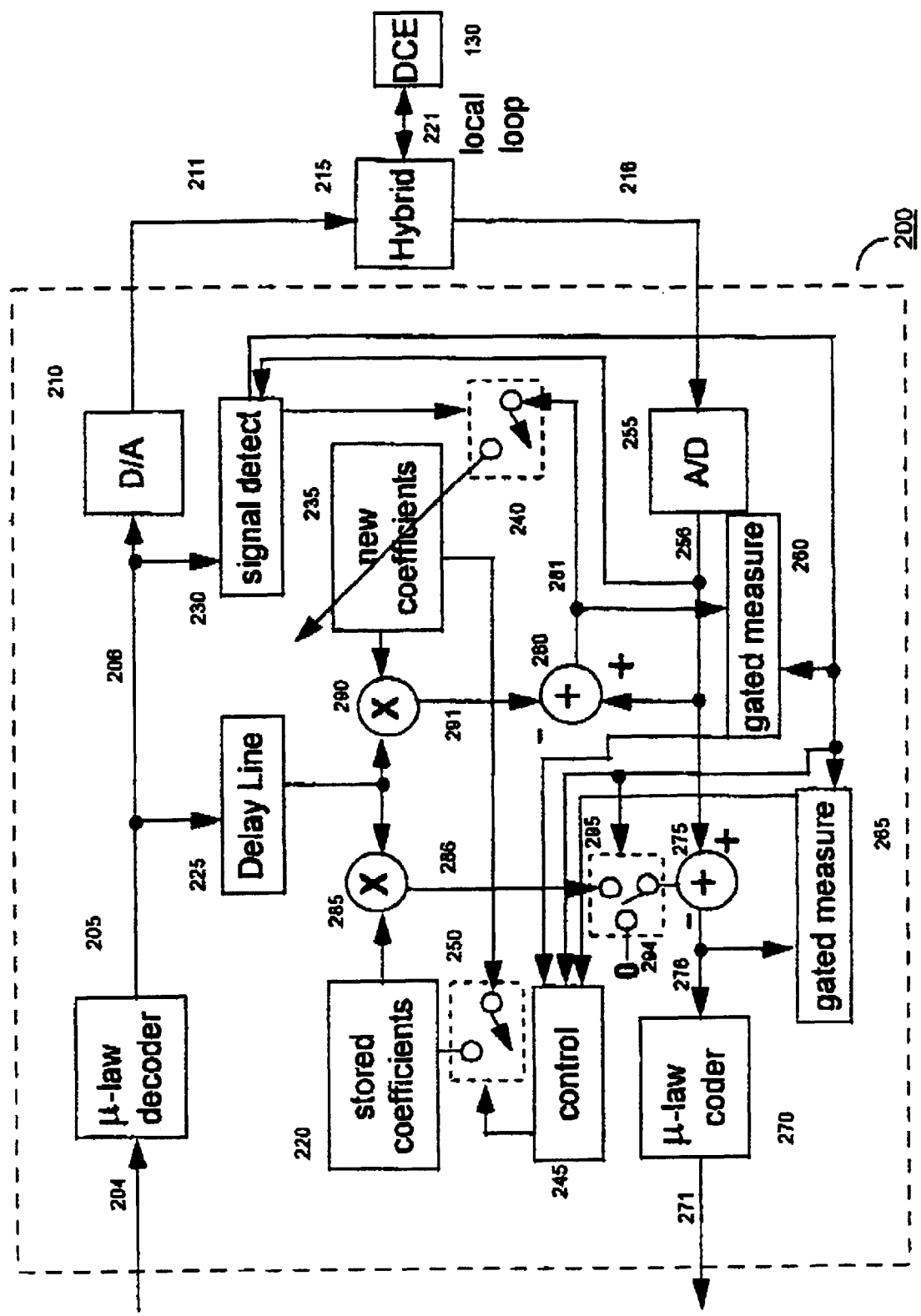
FIG. 2 shows portions of an illustrative CODEC embodying the principles of the invention.

An illustrative high-level block diagram of a portion, 100, of a communication system embodying the principles of the invention is shown in FIG. 1. Portion 100 comprises $\mu$-law decoder 105, D/A (digital-to-analog converter) 110, hybrid 115, A/D (analog-to-digital converter) 155, echo canceler 120, $\mu$-law coder 170, memory 125, and DCE 130. For the purposes of this example, it is assumed that a full-duplex data call exists between DCE 130 and an opposite DCE endpoint (not shown). (It should be noted that this opposite DCE endpoint could be within the network, or digitally connected thereto, as is the case for commercially available 56 kbps modem technology.) The representations shown in FIG. 1 are at a system-level. As such these elements and paths may further represent other circuitry (as illustrated in FIG. 2, described further below). Other than the inventive concept, the elements shown in FIG. 1 are well-known and will not be described in detail.

In FIG. 1, DCE 130 is coupled to local loop 131 for transmitting and receiving in full-duplex fashion. Hybrid 115 terminates the other end of local loop 131 and, as known in the art, couples signals to, and from local loop 131. With respect to transmission from the opposite DCE endpoint (not shown) to DCE 130, $\mu$-law decoder 105 receives a $\mu$-law coded signal 104 from network elements (not shown), and decodes this signal to provide a digital signal 106 for application to D/A 110. The latter converts this digital signal to an analog signal 111, which is applied to hybrid 115 for transmission to DCE 130 via local loop 131. In the other direction of transmission, i.e., with respect to transmission from DCE 130 to the opposite DCE endpoint, hybrid 115 provides an analog signal 116 to A/D 155. This analog signal is representative of the signal transmitted by DCE 130 and, as known in the art, includes an "echo" of analog signal 111. (This "echo" is also referred to herein as a "far echo," but the inventive concept is not limited to removal of far echoes. Here, the phrase "far echo" is with respect to the viewpoint of the opposite DCE endpoint. That is, the "echo" of analog signal 111 is an effect of the presence of hybrid 115, which is at the far-end of the data connection from the point of view of the opposite DCE endpoint.) The analog-to-digital converter, A/D 155, converts analog signal 116 into a digital representation, digital signal 156, for application to echo canceler 120. In accordance with the principles of the invention, echo canceler 120 operates on digital signal 156 (before any companding operation) to remove echoes of analog signal 111. Echo canceler 120 operates using tap coefficients that are stored in memory 125. These stored coefficients, as described further below, are determined off-line and provided to echo canceler 120 via signaling path 126. An echo-canceled signal 121 is provided to μ-law coder 170, which compands the digital signal and provides a μ-law coded signal 171 for transmission across the network (not shown) to the opposite DCE endpoint (not shown).

Figure 3:
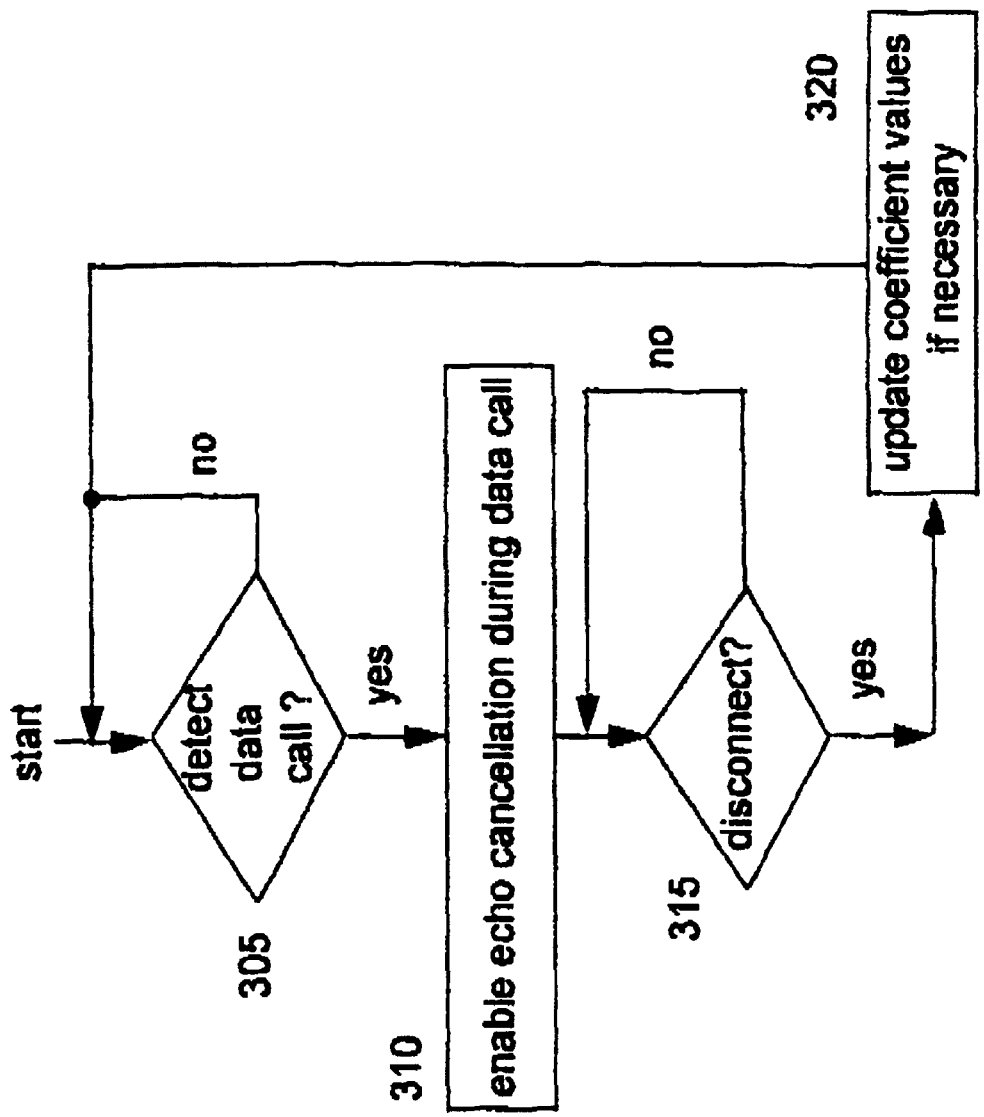
FIG. 3 shows an illustrative flow chart embodying the principles of the invention.

An illustrative embodiment of the inventive concept is shown in FIG. 2, which illustrates the inventive concept as part of a CODEC integrated circuit, CODEC 200. Similar to FIG. 1, CODEC 200 includes μ-law decoder 205, D/A (digital-to-analog converter) 210, A/D (analog-to-digital converter) 255, μ-law coder 270, and hybrid 215. These elements function in a similar fashion to those described in FIG. 1 and will not be described again. CODEC 200 also includes: delay line 225, stored coefficients element 220, dot product multipliers 285 and 290, new coefficient storage 235, combiners (or adders) 275 and 280, signal detect element 230, control element 245, switches 240, 250, and 295, and gated measure elements 260 and 265. CODEC 200 is coupled to, e.g., local loop 221, via hybrid 215. Similarly, CODEC 200 is coupled to other elements of the network (not shown) via μ-law decoder 205 and μ-law coder 270. Other than the inventive concept, the elements shown in FIG. 2 are well-known and will not be described in detail. (It should be noted that only those portions of CODEC 200 related to the inventive concept are shown. CODEC 200 operates in a conventional fashion during a voice call including possible use of echo canceler components for conventional voice echo cancellation. Those parts of CODEC 200 only related to voice call processing are not shown.) In the following description, reference should also be made to FIG. 3, which shows an illustrative flow chart embodying the principles of the invention.

During operation, CODEC 200 switches between a data call state (i.e., a data call is being processed) and a non-data call state (e.g., a voice call is being processed). For the purposes of this example, it is assumed that CODEC 200 functions as in the prior art with respect to a non-data call (e.g., a voice call) and, as such, this operation is not described herein except as noted below in accordance with the inventive concept.

In the data call state, CODEC 200 performs echo cancellation and comprises a fixed echo canceler and an adaptive echo canceler. In FIG. 2, the fixed echo canceler comprises: delay line 225, stored coefficients element 220, dot product multiplier 285, and combiner 275 (ignoring for the moment switch 295). As known in the art, these element make up a transversal FIR (finite impulse response) filter. For example, stored coefficients element 220 is representative of storage for tap coefficient values, delay line 225 is representative of a tapped delay line, dot product multiplier 285 multiplies the tap values with respective tap coefficient values and sums the result. As such, the resulting signal 286 is referred to herein as echo estimate 286. The echo cancellation is performed by combiner 275, which subtracts echo estimate 286 from received digital signal 256 to provide echo canceled signal 276.

The adaptive echo canceler comprises: delay line 225, new coefficients element 235, dot product multiplier 290, and combiner 280 (ignoring for the moment switch 240). The function of the adaptive echo canceler, and in accordance with the principles of the invention, is to adapt off-line. As described further below, during a data call the fixed echo canceler performs echo cancellation of the data signal using stored coefficients from stored coefficients element 220, while the adaptive echo canceler trains off-line to create a new set of coefficients for possible use in a subsequent data call. In order to use the new set of coefficients in a subsequent data call, they are transferred from new coefficients element 235 to stored coefficients element 220 via switch 250 (described below).

As known in the art, network echo canceling is disabled during a data call. In particular, and as noted earlier, at the beginning of a data call a full-duplex modem startup, or handshaking, sequence includes a tone with phase reversals that is recognized by echo cancellation equipment in the PSTN as a signal to disable the network echo cancelers. However, and in accordance with the inventive concept, CODEC 200 includes signal detect element 230 that monitors for particular modem handshaking signaling to enable adaptation of an off-line echo canceler during a data call. This is illustrated by step 305 of FIG. 3. It is assumed that CODEC 200 starts in the non-data call state and signal detect element 230 monitors digital signal 206 and digital signal 256 for detection of an echo canceler disable tone as defined in the art (e.g., a 2100 Hz tone with phase reversals as defined in ITU V.25). If there is no detection of the echo canceler disable tone, CODEC 200 operates in a conventional voice echo cancellation mode (not shown). For example, in the context of FIG. 2, signal 281 could be directly routed to μ-law decoder 270, thereby providing a conventional adaptive voice echo canceler.

However, if an echo canceler disable tone is detected, CODEC 200 switches to the data call state and signal detect element 230 enables echo cancellation during the detected data call in step 310. In this step, signal detect element 230 enables gated measure elements 265 and 260, and controls switches 295 and 240. In particular, signal element 230 controls switch 295 to apply echo estimate signal 286 to combiner 275 for canceling the echo present in digital signal 256. In this case, output signal 276 is an echo-canceled signal. As a result, during the detected data call, CODEC 200 uses a fixed echo canceler architecture for performing echo cancellation by using the coefficient values stored in stored coefficients element 220.

In addition, signal detect element 230 enables, through switch 240, adaptation of new coefficients element 235, i.e., the adaptive echo canceler. In particular, signal detect element 230 controls adaptation of the adaptive echo canceler during an appropriate portion of the DCE handshaking sequence. In this example, the adaptive echo canceler is enabled during a half-duplex portion of a DCE training sequence. As known in the art, full-duplex modems generally follow industry-standard training sequences. These training sequences include at least one half-duplex portion, which occurs either at startup or during a re-train. For example, in the context of ITU standard V.34, this half-duplex portion of the training phase occurs subsequent to the above-mention echo canceler disable tone and after the delay estimation phase, which is signaled by frequency-specific tones. The half-duplex portion has two phases. One phase allows the originating DCE endpoint to train its echo canceler while the answering DCE endpoint is silent. Similarly, the remaining phase allows the answering DCE endpoint to train its echo canceler while the originating DCE endpoint is silent. Signal detect element 230 determines which phase to use for adaptation of the adaptive echo canceler as a function of which DCE endpoint is originating or answering the data call. The latter is determined by where signal detect element 230 detected the echo canceler disable tone, or, alternatively, subsequent startup signals. If signal detect element 230 detected the echo canceler disable tone from digital signal 256, then DCE 130 is the answering DCE, and vice versa. Subsequent to the half-duplex portion of the training, signal detect element 230 disables further adaptation of the adaptive echo canceler via switch 240. As a result, the adaptive echo canceler of CODEC 200 trains off-line to produce a set of new coefficient values stored in new coefficients element 235 for use in a future data call. (It should be noted that a table of predefined signaling information may need to be stored within CODEC 200 to accommodate industry-based standards that have different timing constraints).

After switching to the data call state, signal detect element 230 monitors for disconnect, i.e., termination of the data call, in step 315. Upon detection of disconnect by signal detect element 230, CODEC 200 switches to the non-data call state in step 320. In addition, in this step, control element 245 updates, if necessary, the values of the coefficients in stored coefficients element 220 with the values of the coefficients in new coefficients element 235 (described further below). Also, in this step, signal detect element 230 controls switch 295 to disable echo canceling and adaptation, as described above; and returns to monitoring for the start of another data call in step 305.

As noted above, CODEC 200 includes two echo cancelers, a fixed echo canceler and an adaptive echo canceler. Control element 245 controls the initialization of the coefficient values represented by stored coefficients element 220 and the transfer of new coefficient values to this element. For initialization, the coefficient values represented by stored coefficients element 220 are set to signal level values representative zero upon power-up, or re-initialization, of the equipment. (It should be noted that with coefficient values of zero, no echo cancellation is performed even though echo cancellation is enabled.) For updating the coefficient values of the fixed echo canceler, control element 245 determines when to transfer the new coefficient values to stored coefficients element 220 by using signaling from gated measure elements 245 and 260.

Gated measure element 265 provides a measure of the power level of echo canceled signal 276 to control element 245. Similarly, gated measure element 260 provides a measure of the power level of echo canceled signal 281 to control element 245. It should be noted, that gated measure elements 245 and 265 are enabled only during the above-mentioned half-duplex training portion of the DCE handshaking sequence and are assumed to provide signals representative of zero power values otherwise. Control element 245 transfers the new coefficient values from new coefficients element 235 to stored coefficients element 220 subsequent to the current call if the power level of echo canceled signal 281 (as a result of the new coefficient values) is "better" than the power level of echo canceled signal 276 (as a result of the current coefficient values). An illustrative range is a power level of 3 dB to 6 dB better than the power level of echo canceled signal 276. (Here, it is assumed that a "better" power level corresponds to the adaptive echo canceler performing better echo cancellation than the fixed echo canceler.) Notification of disconnect is provided to control element 245 by signal detect element 230. The new coefficient values are used in a future data call.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was illustrated herein as being implemented with discrete functional building blocks, e.g., an echo canceler, switching elements, etc., the functions of any one or more of those building blocks can be carried out using one or more appropriately programmed processors, e.g., a digital signal processor; discrete circuit elements; integrated circuits; etc.

Also, although detection of a data call was a function of the above-mentioned echo canceler disable tone, other portions of DCE hand shaking sequences may be used, such as the above-mentioned half-duplex portion of a DCE training sequence, or the inventive concept can take advantage of new training sequences in soon-to-be defined industry standards such as in the area of 56 kbps modem technology.

What is claimed:

1. A coder/decoder CODEC for use in echo canceling, the apparatus comprising:
    a decoder for decoding a coded signal and for providing a decoded signal;
    an analog to digital convener for convening a received analog signal into a digital signal;
    an echo canceler comprising:
        a fixed echo canceler for processing the digital signal to provide the an echo-canceled signal for a current data call; and
        an adaptive echo canceler for determining, off-line, the tap coefficient values for a next data call,
        wherein the echo canceler uses coefficient values determined off-line by the adaptive echo canceler during a previous data call for the current data call;
    a coder for coding the echo-canceled signal into a coded signal; and
        memory element for storing the tap coefficient values detected by the adaptive echo canceler such that the stored tap coefficient values used by the fixed echo canceler are not adapted during the current data call.

2. The apparatus of claim 1 further including detection circuitry for detecting the presence of a data call and controlling operation of the echo canceler in response thereto.

3. The apparatus of claim 2 wherein the detection circuitry detects the presence of a data call by detecting a half-duplex training portion of a data communications equipment handshaking sequence.

4. The apparatus of claim 2 wherein the detection circuitry detects the presence of a data call by detecting a predetermined signal from a data communications endpoint.

5. The apparatus of claim 4 wherein the predetermined signal is representative of a signal associated with disabling network echo cancelers.

6. The apparatus of claim 1, whereby the set of tap coefficient values used by the fixed echo canceler were determined by the adaptive echo canceler during a previous data call.

7. A coder/decoder CODEC, comprising:
    an analog-to-digital converter for convening an analog signal to a digital signal;

an echo canceler operative on the digital signal for providing an echo-canceled signal;

a coder operative on the echo-canceled signal for providing a coded signal; and a signal detection element for detecting the presence of a data call and controlling the operation of the echo canceler in response thereto such that the echo canceler is operative during a detected data call and the echo canceler uses, for the detected data call, a set of tap coefficient values that are determined off-line during a previous data call; and an adaptive echo canceler also controlled by the signal detection element in such a way that the adaptive echo canceler performs the off-line training, wherein the set of tap coefficient values used for the detected call is determined by the off-line training from the previous data call, wherein the set of tap coefficient values is stored in a memory element such that stored tap coefficient values used during the detected data call are not adapted during the detected data call.

8. The apparatus of claim 7 wherein the signal detection element detects the presence of a data call by detecting a half-duplex training portion of a data communications equipment handshaking sequence.

9. The apparatus of claim 7 wherein the signal detection element detects the presence of a data call by detecting a predetermined signal from a data communications endpoint.

10. The apparatus of claim 9 wherein the predetermined signal is representative of a signal associated with disabling network echo cancelers.

11. The apparatus of claim 7 further comprising an adaptive echo canceler also controlled by the signal detection element in such a way that the adaptive echo canceler performs the off-line training, wherein the set of tap coefficient values used for the detected data call is determined by the off-line training from the previous data call.

12. The apparatus of claim 11 further comprising a means for transferring the new set of tap coefficient values to the echo canceler for use on the future data call.

13. The apparatus of claim 11 further comprising a comparator for comparing the performance of the echo canceler and the performance of the adaptive echo canceler such that if the comparison indicates that the adaptive echo canceler is performing better than the echo canceler, the set of tap coefficient values used for the detected data call is used on a future data call.

14. The apparatus of claim 13 further comprising a means for transferring the new set of tap coefficient values to the echo canceler for use on the future data call.

15. A method for use in equipment for echo canceling a data signal during a data call, wherein the equipment is different from the respective data communications equipment endpoints of the data call, the method comprising the steps of:

detecting the presence of a data call;

performing an analog-to-digital conversion of an analog signal, of the data call, to provide a digital signal; and if a data call was detected, echo canceling the digital signal to provide an echo-canceled signal, wherein the echo canceling step uses tap coefficient values stored in a memory unit and determined off-line during the previous data call and stored in a memory element, wherein the stored rap coefficient values used during the detected data call are not adapted during the detected data call.

16. The method of claim 15 further comprising the step of performing off-line training during the detected data call for determining new tap coefficient values for use on a future data call.

17. The method of claim 16 further comprising the step of updating the tap coefficient values to the new tap coefficient values after termination of the data call for use on the future data call.

18. The method of claim 16 wherein the performing off-line training step further includes the step of performing additional echo canceling for determining new tap coefficient values for use on a future data call.

19. The method of claim 18 further comprising the step of updating the tap coefficient values to the new rap coefficient values alter termination of the data call for use on the future data call.

20. The method of claim 18 wherein the performing additional echo canceling step provides a new echo canceled signal and further comprising the steps of:

comparing the echo-canceled signal with the new echo canceled signal; and updating the tap coefficient values to the new tap coefficient values if the comparison indicates that the additional echo cancellation is performing better.

21. The method of claim 20 wherein the updating step is performed after termination of the data call for use on the future data call.

22. A coder/decoder (CODEC) for use in a network, the apparatus CODEC comprising:

a fixed echo canceler that performs echo cancellation during a current data call; and a memory having a first set of coefficients and a second set of coefficients, the first set of coefficients being determined off-line in a previous data call and being used by the fixed echo canceler for the current data call, the second set of coefficients being determined off-line in the current data call for use by the fixed echo canceler during a subsequent data call and stored in a memory element, wherein the stored tap coefficient values used during the detected data call are not adapted during the detected data call.

23. Apparatus of claim 22, further comprising an adaptive echo canceler for determining said first set of coefficients during said previous data call and said second set of coefficients during said present data call, and for transferring said first set of coefficients and said second set of coefficients to said memory.

24. A coder/decoder (CODEC) for use in a network, comprising:

a network echo canceler comprising:

a fixed echo canceler that performs echo cancellation during a data call;

an adaptive echo canceler, for determining off-line, the tap coefficient values for the next data call;

a memory having a first set of coefficients and a second set of coefficients for use with the network echo canceler;

a controller functionally connected to the network echo canceler and the memory for causing the network echo canceler to use the first set of coefficients for a current data call, said first set of coefficients being determined off-line during a previous data call by the adaptive echo canceler, for causing the determination of the second set of coefficients off-line during the current data call by the adaptive echo canceler, and for causing the fixed echo canceler to use the second set of coefficients during a subsequent data call;

whereby the coefficients used in the current data call are not determined during the current data call.

* * * * *